United States Patent [19]

Whiteley et al.

[11] 4,052,599

[45] Oct. 4, 1977

[54] METHOD AND APPARATUS FOR DETERMINING COIL SHEET LENGTH

[75] Inventors: Roger L. Whiteley, Bethlehem; Roger T. Boos, Coopersburg, both of Pa.

[73] Assignee: Bethlehem Steel Corporation, Bethlehem, Pa.

[21] Appl. No.: 464,074

[22] Filed: Apr. 25, 1974

[51] Int. Cl.² .................... G01B 7/04; G06F 15/46
[52] U.S. Cl. ........................... 364/469; 242/75.51; 364/562
[58] Field of Search .......... 235/151.32, 151.3, 92 DN, 235/151.1; 73/490, 507, 529; 242/75.51; 33/141 R, 129, 133, 134 R, 134 A; 444/1

[56] References Cited

U.S. PATENT DOCUMENTS

| | | | |
|---|---|---|---|
| 3,197,137 | 7/1965 | Watson | 33/129 X |
| 3,209,130 | 9/1965 | Schmidt | 235/92 |
| 3,406,601 | 10/1968 | Clifford | 235/151.32 X |
| 3,538,729 | 11/1970 | Sterrett, Jr. | 235/92 DN X |
| 3,540,247 | 11/1970 | Diolot | 72/8 |
| 3,553,992 | 1/1971 | Harbaugh | 72/9 |
| 3,663,806 | 5/1972 | Drankhan et al. | 235/151.32 |
| 3,710,084 | 1/1973 | Slagley et al. | 235/151.32 |
| 3,739,276 | 6/1973 | Dornberger | 235/92 DN X |
| 3,781,532 | 12/1973 | Dorsman et al. | 235/151.32 |
| 3,824,694 | 7/1974 | Lesperance et al. | 235/92 DN X |

OTHER PUBLICATIONS

New Method of Measuring Coil Sheet Lengths, R. T. Boos and F. A. Achey, Iron and Steel Engineer, Jan. 1, 1974, pp. 86-90.

*Primary Examiner*—Edward J. Wise
*Attorney, Agent, or Firm*—Joseph J. O'Keefe; John I. Iverson; George G. Dower

[57] ABSTRACT

Sheet material in a rolling mill passes over a measuring roll on its way to a coiler and causes the production of length measuring pulses at the roll and coil wrap pulses at the coiler. Sometimes slipping occurs between the moving sheet and measuring roll, thus causing variable errors in length measurements. A digital computer first stores predetermined constants and all pulse data until the tail end of the sheet is detected, then performs a regression analysis on the pulse data to compensate for measurement errors, and subsequently integrates the corrected data to obtain a highly accurate coil sheet length calculation. The computer also corrects the coil sheet length calculation for additional errors caused by a partial last wrap on large diameter coils, as well as for any significant differences in sheet thickness from a nominal value.

13 Claims, 5 Drawing Figures

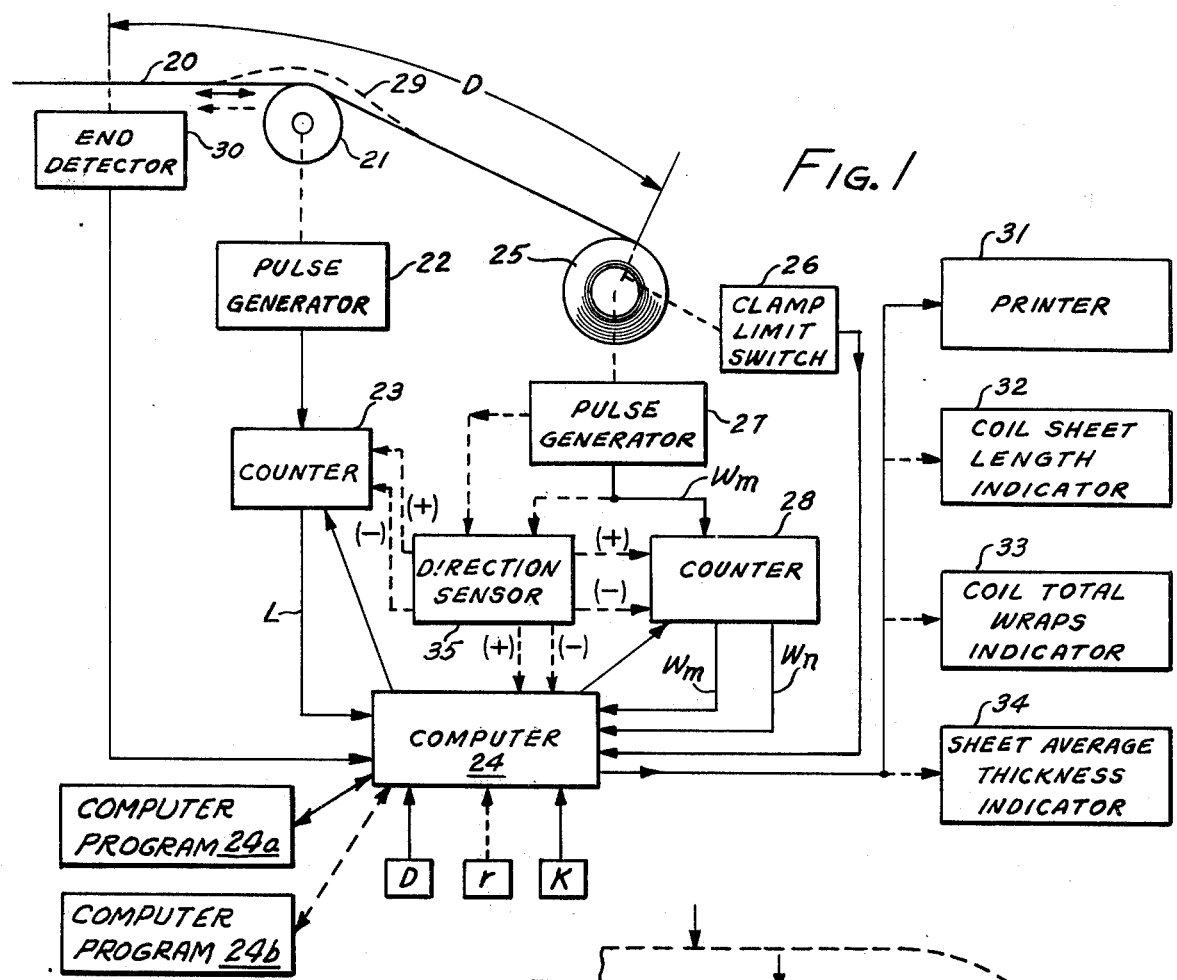
FIG. 1
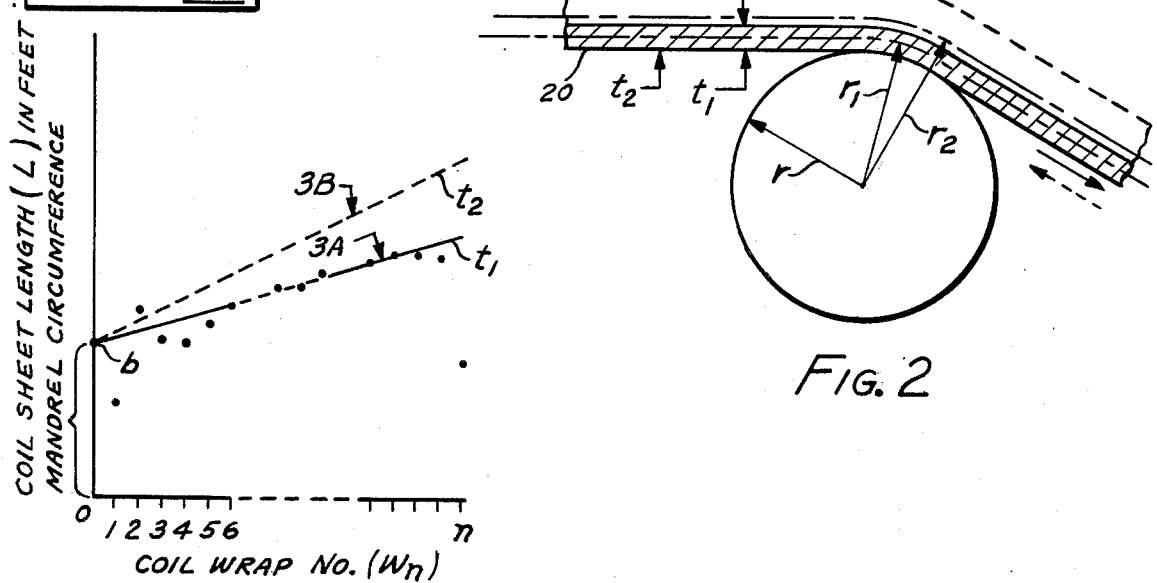
FIG. 2
FIG. 3

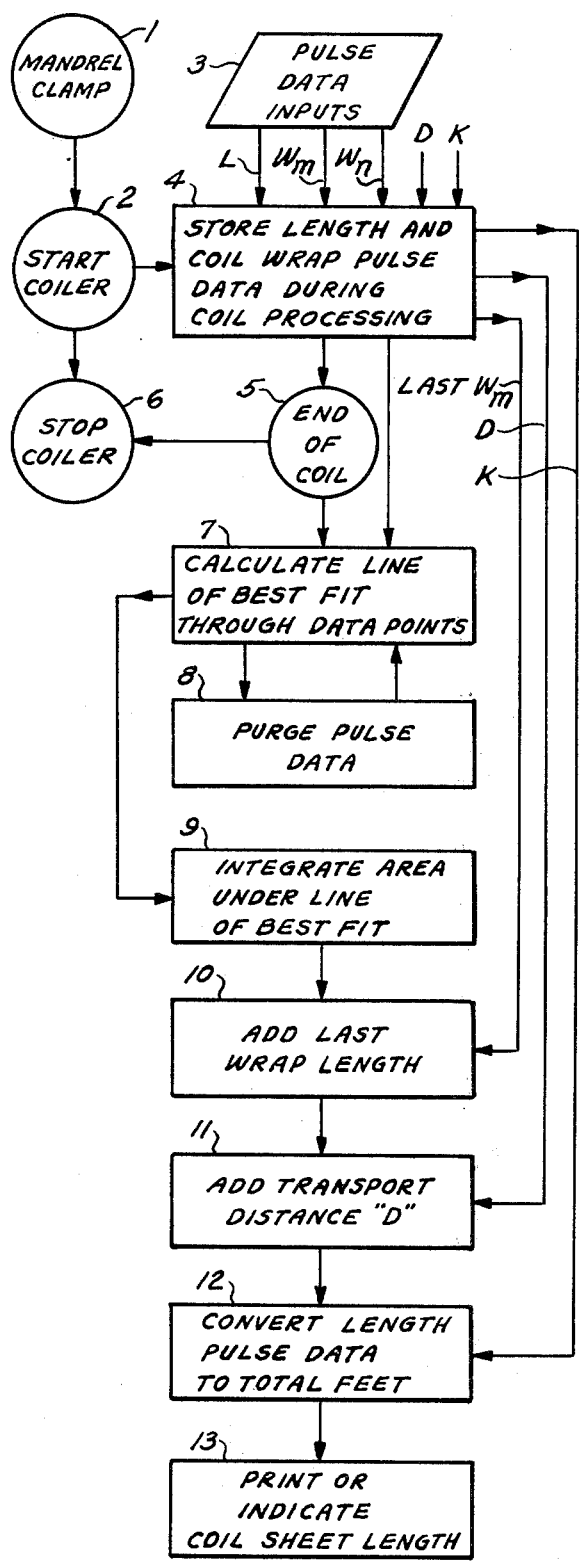
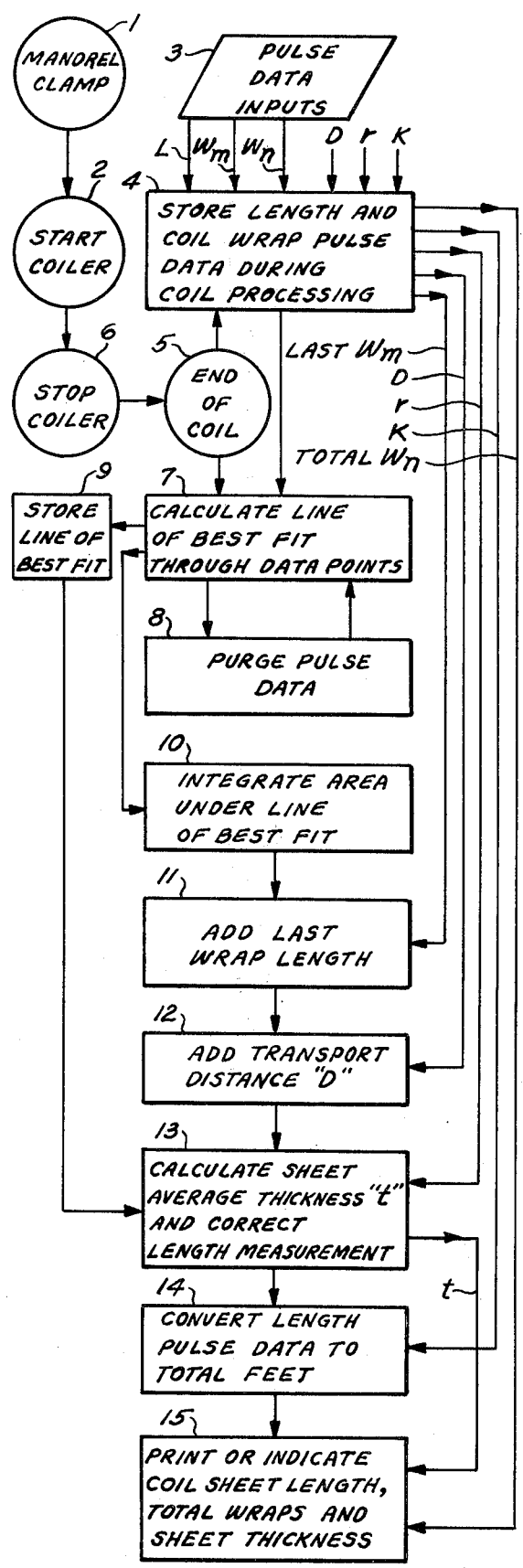

METHOD AND APPARATUS FOR DETERMINING COIL SHEET LENGTH

BACKGROUND OF THE INVENTION

1. Field of the Invention

This invention relates broadly to a method and apparatus for determining coil sheet length. As described below, the invention may be used in a metallic sheet rolling mill to provide a highly accurate computer method and apparatus for determing coil sheet length. In addition, the invention may also be used in the production or processing facilities of other sheet materials, such as in the paper and plastic industries.

2. Description of the Prior Art

In the steel industry a wide range of sheet materials having various thicknesses, widths, composition and finishes are produced on high speed rolling mills. Frequently, the rolled sheet product is wrapped in large diameter coils to await shipment. Heretofore, customer billing practices were based on actual weight of the coil sheet product when shipped, there being no assurance to the customer as to actual coil sheet length. Industry records have shown that variations in production practices have caused significant variations in coil sheet length for comparable orders.

Currently, however, a theoretical weight billing practice is in effect for coil sheet steel products. That is, in one case the billing of steel coil sheet is based on a weight calculated from a customer's ordered thickness, width, composition and length, the latter being indicated by the steel producer's rolling mill coil sheet length measurements. Under the theoretical weight billing practice, coil sheet length shortages are debited to the producer, and sheet length overages are credited to him. In practice, however, coil shortage debits are claimed more frequently than credits allowed for coil length overages in the absence of accurate coil length records. Therefore, both coil sheet length shortages as well as overages are in reality a liability to the coil sheet steel producer. Hence it behooves the steel producer to procure and maintain accurate coil sheet length measuring apparatus to minimize such liabilities.

Prior art methods and apparatus for measuring coil sheet length using a measuring roll require that a non-slip condition be constantly maintained between the moving sheet and the circumferential surface of the measuring roll. Various arrangements of tachometers or rotary pulsers driven by the measuring roll and/or a coiler mandrel, and connected to either an analog or a digital electronics package, provide a pulse signal proportional to measuring roll circumference and/or number of coil wraps, and therefore proportional to coil sheet length.

As is often the case in sheet steel mill rolling practices, particularly in high speed mills, the non-slip condition between moving sheet and measuring roll circumference cannot always be maintained. There are a number of operator preferences and structural prohibitions that permit only a single billy roll installation as a universal solution to coil sheet length measuring problems in both new and old modified sheet rolling mills. Some of the prior art methods and apparatus tested under the slip conditions in mills produced coil sheet length errors as great as ± 2%. The resulting shortage alone amounted to considerable customer debits for a single year. In addition, none of the prior art arrangements provided slip compensation, nor correction for errors due to partial last wrap on the coiler, which on large diameter coils of about 5 feet or more may produce substantial errors in itself. Nor was correction made for still further errors produced by sheet thickness varying from a nominal value, except by actually gaging the moving sheet and feeding a corresponding signal into the electronics package for compensation purposes. Moreover, none of the prior art arrangements having a measuring roll and experiencing slippage permit reversal of the rolling mill sheet movement without producing substantially erroneous length data.

SUMMARY OF THE INVENTION apparatus

One of the objects of this invention is to provide an improved method and apparatus for determining coil sheet length on a more accurate basis than heretofore.

Another of the objects of this invention is to provide a highly accurate computer method and apparatus for determining coil sheet length.

Another object of this invention is to provide a method and apparatus for accurately determining coil sheet length which automatically compensates the length measurement for variable errors developed by slippage between the moving sheet and a measuring roll surface.

A further object of this invention is to provide a method and apparatus for accurately determining coil sheet length which automatically corrects the length measurement for variable errors ocurring by failure to include the partial last coil wrap in the total coil sheet length measurement.

Still another object of this invention is to provide a method and apparatus for accurately determining coil sheet length which automatically corrects the length measurement for variable errors due to variations in sheet thickness.

Yet another object of this invention is to provide a method and apparatus for accurately determining coil sheet length in a reversible rolling mill while preferably compensating for the aforementioned measuring roll slippage.

The foregoing objects are attainable by a method and apparatus which employs an arrangement whereby sheet material in a rolling mill is passed over a measuring roll, on its way to a coiler, the measuring roll being fitted with a first rotary pulser which produces length measuring pulses and the coiler mandrel being fitted with a second rotary pulser which produces two kinds of coil wrap pulses. A digital computer is included which is programmed to first store certain constants and all pulse data until the tail end of the moving sheet is detected, then programmed to perform a regression analysis on the pulse data to compensate for measurement error caused by slippage, and subsequently programmed to integrate the corrected data to obtain a highly accurate coil sheet length calculation in the order of about ± ⅛% at 95% confidence. The digital computer is also programmed to correct the coil sheet length calculations for additional errors caused by a partial last wrap on any size coil, as well as for any differences, in sheet thickness from a nominal value. Accommodating rolling mill reversals is done by an electronic direction sensor operatively associated with the rotary pulsers to reverse the effectiveness of the pulse data.

BRIEF DESCRIPTION OF THE DRAWINGS

FIG. 1 is a block diagram of a highly-accurate coil sheet length determining embodiment of the present invention.

FIG. 2 is an enlarged cross-section of the measuring roll and a portion of sheet material of various thicknesses in contact therewith.

FIG. 3 is a graph illustrating the scattering of data points including the line of best fit at curve 3A for a sheet material of one thickness. Another curve 3B is representative of material of a greater thickness.

FIG. 4 is a flow diagram of a computer program for one embodiment of the present invention.

FIG. 5 is a flow diagram of a computer program for a second embodiment of the present invention.

DESCRIPTION OF THE PREFERRED EMBODIMENTS

Referring to FIG. 1, a high-speed sheet steel rolling mill (not shown) causes sheet 20 to move in the direction of a coiler at the end of the mill line. In so doing, moving sheet 20 is brought into contact with the circumference of measuring roll 21 and causes roll 21 to revolve in direct proportion to the length of sheet 20 during contact therewith. It has been found in dealing with many length measuring problems in both new and modified old mills that a billy, or independent, roll is preferred for length measuring purposes, rather than attempting to find a suitable work roll, pinch roll or other source for originating length measurements because of numerous structural or operating prohibitions encountered in actual practice. Furthermore, the billy roll will have a far greater life and circumferential accuracy than either a work roll or a pinch roll.

Measuring roll 21 has coupled to it a length, or "L", measuring pulser 22, a conventional rotary shaft pulser which produces "L" pulse data at a precise rate of about 300 pulses per revolution of roll 21. When measuring roll 21 has a constant radius "r" (shown in FIG. 2), pulser 22 will have a pulse-to-length conversion factor "K" of about 40 pulses per foot of roll circumference when sheet 20 thickness "t" is minimal. Therefore, the same "K" factor would apply to each foot of sheet 20 moving in constant contact with the circumference of roll 21, that is, when no slipping or skipping occurs. As sheet 20 thickness "t" increases to "$t_1$" or "$t_2$", the effective radius of measuring roll 21 increases correspondingly to "$r_1$" or "$r_2$", thus requiring a corresponding length correction. Provisions are described below for automatically correcting the calculated length if increases in sheet 20 thickness "t" will have an undesirable effect on overall length measuring accuracy.

Measuring pulser 22 output is fed to a conventional electronic counter 23 where the "L" data pulses are counted and then fed at "l" pulse data input to digital computer 24. Computer 24 includes conventional input, storage, data processing and output sections for receiving input data and producing output data as required in connection with the computer programs 24a or 24b illustrated in FIGS. 4 and 5 and described below. Computer 24 may in effect be dedicated for sheet length measurement of one or more mills or perform sheet length determinations and other duties on a time sharing basis.

When the sheet 20 rolling mill (not shown) is set up initially, the head end of sheet 20 is placed in a clamping slot in coiler mandrel 25 and clamped in place at an automatic indexing position on the coiler rotational axis. Upon completion of the clamping procedure, clamping limit switch 26 so signals the coiler drive control (not shown) to start both the mill and the coiler, and signals computer 24 to start storing pulse data in storage facilities as will be explained below.

Coiler mandrel 25 has coupled to it a coil wrap, or "Wm", measuring pulser 27, another conventional rotary shaft pulser similar to pulser 22. Pulse 27 produces "Wm" pulses at a precise rate of about 300 pulses per revolution of mandrel 25, thereby enabling any coil wrap circumference to be divided into 300 parts. Coil wrap pulser 27 output is fed to a conventional electronic counter 28 where "Wm" data pulses are counted and fed as "Wm" pulse data input to computer 24 for enabling the determination of the last partial wrap on any coil as described below. Counter 28 is adapted to generate a wrap number, or "Wn", pulse for every complete mandrel revolution, i.e., once every 300 counts from the mandral starting, or indexing, position. The "Wn" pulses are also fed to computer 24 which uses them to count coil wraps as well as reset pulses which are fed to counters 23 and 28 to cause their resetting only at every complete coil wrap and at the beginning of each coiling operation.

It should be noted that in the event a coiler mandrel is used without an automatic indexing position, coil wrap pulser 27 should be modified to include an additional indexing pulse output corresponding to the counter 28 "Wn" pulse output and counter 28 should not be adapted to generate this pulse. A new counter (not shown) should be included in the FIG. 1 embodiment and wrap number "Wn" pulses counted therein and then fed to computer 24. The new counter, along with counter 28, should be the same type as counter 23, but the new counter should supply computer 24 with the reset pulses for counters 23 and 28. The new counter should be reset by computer 24 after the coil sheet length measuring procedures have been completed.

Consider for the moment that when the sheet rolling mill (not shown) accelerates from standstill to a high operating speed, slipping occurs between steel sheet 20 and the circumference of measuring roll 21 until the inertia of roll 21 is overcome. This produces a variable error in the actual "L" pulse data at counter 23 in relation to any given coil wrap with respect to the "Wn" pulse data at counter 28. Likewise, when the mill decelerates to a stop, or otherwise changes speed, slipping also occurs and produces an additional error. Moreover, if speed synchronization between sheet 20 and coiler mandrel 25 is not maintained in a precise relationship, then sheet bulging 29 may occur, thus causing periodic skipping between sheet 20 and roll 21 which is an additional source of variable errors in "L" pulse data. The skipping condition may also come about easily by an unusually thick and/or stiff steel sheet 20 when emerging from work rolls at an improper temperature, or by a detuned automatic speed control system.

Each of the foregoing source of errors will be referred to hereafter simply as slippage errors. Ordinarily, each error source has a different unpredictable effect, both singly and in combination, on the overall accuracy of any coil sheet length measuring system. The slippage errors are therefore exemplified in FIG. 3 as a single data point for each coil wrap, but are scattered for successive wraps due to the magnitude of their different effects in the beginning and ending wraps as compared to their minimal, or non-existent, effects for the majority of wraps therebetween.

The "$n^{th}$" wrap is shown in FIG. 3 to be only a partial wrap. This frequently occurs in actual rolling practice because end detector 30 detects the passage of the tail end of sheet 20 and signals computer 24 to terminate storage of "L", "W$m$" and "W$n$" data pulses. After the moment of termination, computer 24 corrects the pulse length data "L" for slippage, transfers the length determining function for the last or "$n^{th}$" coil wrap from "L" to "W$m$" data source and adds the last partial wrap length data to correlated "L" data, and adds to this sum a constant "D" which represents the transport distance from end detector 30 to the automatic indexing position of coiler mandrel 25 mentioned above. As is explained below, a high-accuracy coil sheet length measuring system subject to substantially varying input errors is provided with an overall ± $\frac{1}{2}$% accuracy on a repeatable basis.

After all computations are made, computer 24 supplies suitable signals to printer 31 and/or coil sheet length indicator 32 as are required to record and/or indicate a highly accurate coil sheet length determination of sheet steel 20 when computer 24 is programmed according to computer program 24$a$ illustrated by the flow diagram shown in FIG. 4. In another embodiment, addition features of computer 24 calculating sheet 20 average thickness "$t$" and effectively correcting conversion factor "K" for actual average thickness "$t$", and counting the total number of coil wraps, are signalled to printer 31 and/or additional respective indicators 33 and 34 when computer 24 is programmed according to program 24$b$ illustrated by the flow diagram shown in FIG. 5.

Before explaining the computer 24 programs 24$a$ or 24$b$, it should be observed that the FIG. 1 embodiment may be modified to accommodate directional reversals of the high-speed sheet rolling mill (not shown) when coiler mandrel 25 has only a partially full wrap as are frequently encountered in some steel rolling mill lines. This is accomplished by incorporating direction sensor 35 which receives coil wrap "W$m$" pulses from pulser 27 and a second but out of phase pulse source identical to "W$m$" from pulser 27, the latter being obtained by modifying pulser 27 in a well known manner. Direction sensor 35 consists of well known digital logic devices arranged in a conventional pulse phase detection circuit to provide add (+) and subtract (−) counter control signals at separate outputs. Counters 23 and 28 are modified to become well known up-down digital counters, each operating under control of the (+) and (−) output control signals of direction sensor 35. These same output control signals are also fed to computer 24 to control the storage of counters 23 and 28 pulse data. Thus, when the sheet rolling mill (not shown) is causing sheet 20 to move in the forward direction and wind up on coiler mandrel 25, phase detector 35 will cause modified counters 23 and 28 and computer 24 to add (+) pulses received from their respective pulsers 22 and 27. Conversely, when sheet 20 is moving in the reverse direction and unwinding from coiler mandrel 25, phase detector 35 will sense a pulser 27 phase reversal and cause modified counters 23 and 28 to subtract (L31) pulses received from their respective pulsers 22 and 27. This arrangement, while required only on reversing sheet rolling mills, will keep the coil sheet length pulse data in proper orientation.

Turning now to FIG. 4, computer program 24$a$ and its relation to the several inputs from the length measuring, coil wrap and certain constant data sources, and the output signals for printing and/or indicating coil sheet length determination, will now be described. It is presumed that the sheet rolling mill (not shown) has advanced the head end of sheet 20 over measuring roll and into coiler mandrel 25 clamping slot when the mandrel is rotated into the axial indexing position referred to above.

Step 1 occurs when mandrel limit switch 26 closes. Step 2 is enabled by step 1 and causes sheet rolling mill (not shown) to move sheet 20 over roll 21 and be coiled on coiler mandrel 25. This initiates and maintains generation of length measuring pulse data "L" and coil wrap and coil wrap number pulse data "W$m$" and "W$n$" illustrated in step 3. Step 4 shows the continuous storing of "L", "W$m$" and "W$n$" pulse data, plus constant "D", the sheet transport distance, and the pulse-to-length conversion constant "K" during coil processing. Pulse data storage continues until data input is terminated by step 5 when the end of sheet 20 is detected by end detector 30. Step 5 also maintains the data storage as well as causes the sheet rolling mill (not shown) and coiler mandrel 25 to decelerate and stop rotating per step 6, thereby ceasing the generation of "L", "W$m$" and "W$n$" pulse data sources when the mill comes to a stop.

Step 7 calls the length and coil wrap data "L" and "W$n$" from storage and causes the calculation of the best fit straight line through the data points shown in FIG. 3 and as exemplified by curve 3A. This is done by utilizing a conventional computer regression analysis of the "L" pulse data with respect to the "W$n$" pulse data. The conventional regression analysis may be performed on computer 24 by employing computer program 24$a$ and 24$b$ having a well known statistical polynomial regression subroutine disclosed, for example, by International Business Machines Corporation (IBM) in their IBM Application Programmer's Manual #H20-0252-3, 1130 Scientific Subroutine Package (SSP) (1130-CM-02X), Statistics Group, pages 28, et seq, Fourth Edition (September 1968) Step 8 calls for purging the erroneous or slippage "L" pulse data and repeating step 7 until all data points are within a prescribed limit, for example, three times the mean deviation. This procedure causes computer 24 to calculate the slope "$m$", plus the intercept "$b$" for the curve 3A in FIG. 3. The same procedure is followed for curve 3B when using a thicker sheet 20 than for curve 3A. Although the slope "$m$" is different, the intercept "$b$" is the same. This is because the intercept "$b$" calculation made by computer 24 is in reality a calculation of the coiler mandrel 25 circumference without having any mandrel dimensions.

The line of best fit through length "L" pulse data is shown in curve 3A to be essentially a straight line which represents the equation $y = mx + b$. The straight line equation was selected because it was assumed that steel sheet 20 thickness "$t$" was substantially uniform from head-to-tail end of sheet 20. However, steel sheet 20 is sometimes rolled with a normal head-to-tail end taper in thickness "$t$" as a result of setting up and trimming automatic gauge controls. Under these conditions the line of best fit through the data points may well be a nonlinear function and may be represented by, for example, a polynomial equation $y = mx^2 + mx + b$.

After steps 7 and 8 have beeen completed, the coil sheet length "L" pulse data for all full wraps is determined in step 9 by computer 24 integrating the area under the line of best fit in curve 3A, for example, from zero through the last full coil wrap number located in storage. If there is no partial last coil wrap, or if it is acceptable to neglect the value of the partial last coil wrap, then step 10 may be omitted. Otherwise, step 10 shows the partial last coil wrap, "Wm" pulse data being added to the coil sheet length pulse data determined in step 9. This is done by calling the last wrap "Wm" pulse data from storage, comparing it to a maximum value, in this case 300 pulses, determining the percentage of actual "Wm" to a full wrap, multiplying the last calculated full wrap length in pulses by this percentage, and adding the partial last wrap calculation to the coil sheet length determination of step 9. At this point computer 24 has determined the coil sheet length "L" pulse data of that portion of sheet 20 coiled on mandrel 25 upto the time sheet 20 tail end was detected by end detector 30.

Step 11 shows the transport distance constant "D" pulse data being called from storage and added to the coil sheet length "L" pulse data from step10, or added to step 9 if step 10 was omitted. This sum now represents the total coil sheet length "L" pulse data of the entire sheet 20 that was processd by the rolling mill (not shown). Step12 calls the constant factor "D" from storage and converts total "L"]pulse data to total coil sheet length in feet for the entire sheet 20. The length data is stored until cleared. Step 13 feeds a corresponding signal to printer 31 and/or coil sheet length indicator 32. Before repeating the entire computer program 24a, all computer storage means is to be cleared for the next sheet data entry.

Referring to FIG. 5, program 24b will be described which adds to FIG. 4 computer program 24a the additional features of calculating the average thickness "t" of sheet 20 and correcting the length "L" pulse data for such increases, and printing and/or indicating these additional features together with total coil wrap number data.

Steps 1 through 4 are the same as corresponding steps in FIG. 4 computer program 24a with the exception that step 4 includes storing an additional constant "r" which is the radius of measuring roll 21. Steps 5 through 8 are the same as corresponding steps in FIG. 4 computer program 24a. When the final line of best fit is determined in step 7, it is then stored in step 9 so that $y = mx + b$ may be called later. Steps 10 through 12 correspond to steps 9 through 11, respectively, in the FIG. 4 computer program 24a. This sum represents the total original sheet length "$L_o$" pulse data, less corrections for sheet thickness differences from normal.

Step 13 calculates and stores sheet 20 average thickness "t" by solving the equation $t = m/(2\pi)$, where "m" is called from storage in step 9. Step 13 also calculates a correction of original coil sheet length "$L_o$" pulse data obtained from step 12 by solving the equation $L_c = L_o(1 + (t/2r))$, where "r" is called from storage in step 4. The thickness-corrected coil sheet length "$L_c$" pulse data is converted in step 14 to length in feet by calling the original convertion factor "K" from storage in step 4. This length data is stored until cleared. Step 15 feeds a thickness-corrected coil sheet length signal from step 14, a coil total wrap number signal from step 4, and a calculated average sheet thickness signal to printer 31 and/or to corresponding indicators 32, 33 and 34. Before repeating the entire computer program 24b all computer storage means is to be cleared for the next sheet data entry.

We claim:

1. A computer method of determining the coil length of sheet material moving in contact with a length measuring roll and subsequently coiled on a coiler mandrel, which comprises:
    a. generating a sheet length measuring signal at said roll which includes slippage errors when slippage occurs between said sheet material and said roll,
    b. generating a coil wrap signal at said coiler mandrel,
    c. computing a slippage-error compensated sheet length measuring signal, and
    d. computing the integral of the compensated sheet length measuring signal between limits represented by the coil wrap signal to determine coil sheet length.

2. The method of claim 1 wherein step (c) comprises:
    1. storing the sheetlength signal and the coil wrap signal,
    2. computing a regression analysis of the stored sheet length measuring signal to determine a line of best fit through scattered signal data, and
    3. purging the signal from step (c.2) to compensate the sheet length signal for slippage errors.

3. The method of claim 2 further including the step:
    e. computing the average thickness of said sheet based on an equation involving the slope of the line of best fit from step (c.2.)

4. The method of claim 2 further including the steps:
    f. computing the average thickness of said sheet based on an equation involving the slope of the line of best fit from step (c.2), and
    g. computing the thickness-corrected coil sheet length based on an equation involving the coil sheet length from step (d), the average thickness of said sheet from step (f) and the actual radius of said measuring roll.

5. A computer method of determining the coil length of sheet material moving in contact with a length measuring roll and subsequently coiled on a coiler mandrel, which comprises:
    a. generating a sheet length measuring signal at said roll which includes slippage errors when slippage occurs between said sheet material and said roll,
    b. generating a fractional coil wrap signal and a coil wrap number signal at said coiler mandrel,
    c. computing a slippage-error compensated sheet length measuring signal,
    d. computing the integral of the compensated sheet length measuring signal between limits represented by the coil wrap number signal, and
    e. computing a partial last wrap length signal from the fractional coil wrap signal and adding same to the signal from step (d) to determine the total coil sheet length.

6. A computer method of determining the coil length of sheet material moving reversibly in contact with a length measuring roll and subsequently coiled on a coiler mandrel, which comprises:
    a. generating a sheet length measuring signal at said roll which includes slippage errors when slippage occurs between said sheet material and said roll,
    b. generating first and second coil wrap signals at said coiler mandrel,
    c. sensing the direction of sheet movement based on a predetermined characteristic of said first and second coil wrap signals,
    d. computing a slippage-error compensated sheet length measuring signal effective for only one direction of sheet movement, and e. computing the integral of the compensated sheet length measuring signal between limits represented by one of the coil wrap signals to determine coil sheet length in one direction of sheet movement.

7. Apparatus for determining the coil length of sheet material moving in contact with a length measuring roll and subsequently coiled on a coiler mandrel, said apparatus comprising:
   a. means coupled to said roll for generating a sheet length measuring signal which includes slippage errors when slippage occurs between said sheet material and said roll,
   b. means coupled to said coiler mandrel for generating a coil wrap signal,
   c. programmed computer means including computer program means for performing the following functions in sequence:
      1. computing a slippage-error compensated sheet length measuring signal, and
      2. computing the integral of the compensated length measuring signal between limits represented by the coil wrap signal for determining coil sheet length.

8. The apparatus of claim 7 further including:
   d. means for utilizing the computer means integrated sheet length measuring signal to display the coil sheet length.

9. The apparatus of claim 7 wherein the portion of said sequential computer program means for computing the slippage-error compensated sheet length measuring signal is adapted for:
   11. storing the sheet length signal and the coil wrap signal,
   12. computing a regression analysis of the stored sheet length measuring signal to determine a line of best fit through scattered signal data and
   13. purging the signal from the preceding function to compensate the sheet length signal for slippage errors.

10. The apparatus of claim 9 wherein said sequential computer program means is further adapted for:
   3. computing an average sheet thickness signal as a function of the slope of the aforesaid line of best fit through scattered signal data.

11. The apparatus of claim 9 wherein said sequential computer program means is further adapted for:
   3. computing an average sheet thickness signal as a function of the slope of the aforesaid line of best fit through scattered signal data, and
   4. computing a thickness-corrected coil sheet length signal as a function of the aforesaid computer means integrated sheet length measuring signal, the average sheet thickness signal, and a signal representing the actual radius of said measuring roll.

12. Apparatus for determining the coil length of sheet material moving in contact with a length measuring roll and subsequently coiled on a coiler mandrel, said apparatus comprising:
   a. means coupled to said roll for generating a sheet length measuring signal which includes slippage errors when slippage occurs between said sheet material and said roll,
   b. means coupled to said coiler mandrel for generating a fractional coil wrap signal and a coil wrap number signal,
   c. programmed computer means including computer program means for performing the following functions in sequence:
      1. computing a slippage-error compensated sheet length measuring signal,
      2. computing the integral of the compensated sheet length measuring signal beween limits represented by the coil wrap number signal, and
      3. computing a partial last wrap length signal from the fractional coil wrap signal and adding same to the integrated sheet length measuring signal for determining the totalcoil sheet length.

13. Apparatus for determining the coil length if sheet material moving reversibly in contact with a length measuring roll and subsequently coiled on a coiler mandrel, said apparatus comprising:
   a. means coupled to said roll for generating a sheet length measuring signal which includes slippage errors when slippage occurs between said sheet material and said roll,
   b. means coupled to said coiler mandrel for generating first and second coil wrap signals,
   c. means responsive to the first and second coil wrap signals for sensing the direction of sheet movement and producing first and second control signals,
   d. programmed computer means including computer program means for performing the following functions in sequence:
      1. computing a slippage-error compensated sheet length measuring signal in response to said first and second control signals and effective for computation in only one direction of sheet movement, and
      2. computing the integral of the compensated sheet length measuring signal between limits represented by one of the coil wrap signals to determine coil sheet length in one direction of sheet movement.

* * * * *